(12) United States Patent
Ishigaki

(10) Patent No.: US 9,564,823 B2
(45) Date of Patent: Feb. 7, 2017

(54) DC-DC POWER CONVERSION CIRCUIT WITH MAGNETIC AND CAPACITIVE ISOLATION

(71) Applicant: Toyota Motor Engineering & Manufacturing North America, Inc., Erlanger, KY (US)

(72) Inventor: Masanori Ishigaki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 163 days.

(21) Appl. No.: 14/504,125

(22) Filed: Oct. 1, 2014

(65) Prior Publication Data
US 2016/0099651 A1 Apr. 7, 2016

(51) Int. Cl.
| H02M 3/335 | (2006.01) |
| H02M 3/00 | (2006.01) |
| H02M 3/28 | (2006.01) |
| H02M 1/00 | (2006.01) |

(52) U.S. Cl.
CPC ......... *H02M 3/33584* (2013.01); *H02M 3/005* (2013.01); *H02M 3/285* (2013.01); *H02M 2001/0058* (2013.01)

(58) Field of Classification Search
CPC .............. H02M 3/335; H02M 3/33507; H02M 3/33523; H02M 3/33592; H02M 2001/0032; H02M 2007/4815; Y02B 70/1433; Y02B 70/1441
USPC ............................................ 363/21.01–21.18
See application file for complete search history.

(56) References Cited

U.S. PATENT DOCUMENTS

| 6,490,181 | B1 | 12/2002 | Liu et al. | |
|---|---|---|---|---|
| 7,876,581 | B2 | 1/2011 | Kim et al. | |
| 8,670,250 | B2 | 3/2014 | Fu et al. | |
| 2004/0145439 | A1* | 7/2004 | Grilo | H01F 19/08 336/145 |
| 2005/0073861 | A1* | 4/2005 | Ke | H02M 1/34 363/20 |
| 2008/0304292 | A1* | 12/2008 | Zeng | H02M 3/285 363/21.12 |
| 2009/0231887 | A1* | 9/2009 | Ye | H02M 3/33569 363/21.02 |
| 2013/0214607 | A1 | 8/2013 | Harrison | |
| 2013/0300210 | A1 | 11/2013 | Hosotani | |

* cited by examiner

*Primary Examiner* — Yemane Mehari
(74) *Attorney, Agent, or Firm* — Oblon, McClelland, Maier & Neustadt, L.L.P.

(57) ABSTRACT

A power transfer system includes DC-DC power conversion circuitry that has a first switch and a second switch on either side of a transformer with a first capacitor and a second capacitor cross-connected across the transformer. A direction of power transfer is determined, and primary and secondary sides of the DC-DC power conversion circuitry are aligned based on the direction of power transfer. A quantity of power transfer through the DC-DC power conversion circuitry is determined based on power and voltage characteristics of electrical components. A duty cycle and a switching frequency for the first switch or second switch is determined based on the quantity of power to be transferred. The primary and secondary switches are controlled using switching.

17 Claims, 14 Drawing Sheets

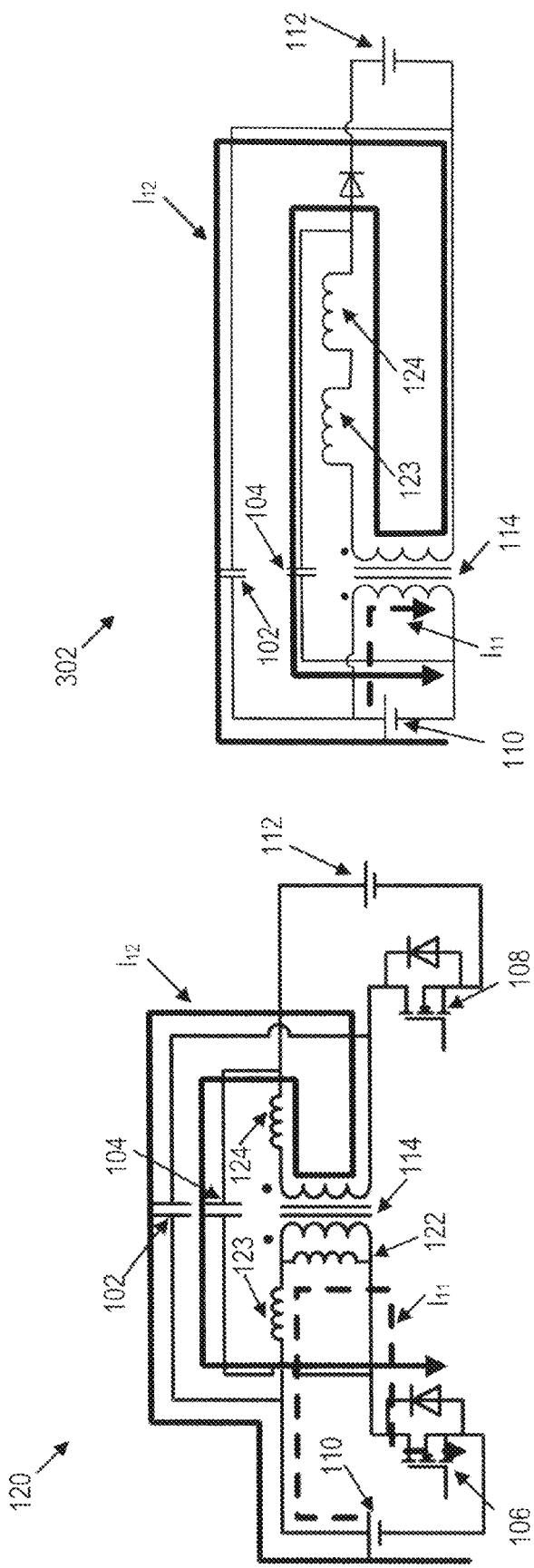

DC-DC POWER CONVERSION CIRCUIT WITH MAGNETIC AND CAPACITIVE ISOLATION

BACKGROUND

A DC-DC converter can employ magnetic and capacitive isolation to conduct bi-directional power transfer. U.S. Patent Application Publication No. 2013/0300210 A1 entitled "Power Transfer System" by Hosotani describes a power transfer system that performs DC-DC power conversion through soft switching and supports bi-directional power transfer through symmetrical full bridge switching circuits.

SUMMARY

In an exemplary implementation, a system can include: DC-DC power conversion circuitry including a first switch and a second switch on either side of a transformer with a first capacitor and a second capacitor cross-connected across the transformer and control circuitry. The control circuitry can: determine a direction of power transfer through the DC-DC power conversion circuitry, align a primary side and a secondary side of the DC-DC power conversion circuitry based on the determined direction of power transfer, determine a quantity of power transfer through the DC-DC power conversion circuitry based on power and voltage characteristics of electrical components, determine a duty cycle and a switching frequency for the first switch or the second switch based on the quantity of power transfer through the DC-DC power conversion circuitry, and control switching of the first switch and the second switch.

The DC-DC power conversion circuitry can perform bi-directional power transfer. The system can determine the direction of power transfer by selecting the first switch or the second switch to cycle on and off.

The system can increase the duty cycle or switching frequency of the first switch or the second switch to increase the quantity of power transferred through the DC-DC power conversion circuitry. The system can also decrease the duty cycle or switching frequency of the first switch or the second switch to decrease the quantity of power transferred through the DC-DC power conversion circuitry.

The system can modify the duty cycle or switching frequency of the first switch or the second switch to reduce losses due to stray resonance by decreasing a length of time that the primary switch or the secondary switch is off.

A plurality of DC-DC power conversion circuitry can be connected in series or parallel in a distributed power system to transfer power between electrical components. The electrical components in the distributed power system can have unequal power and voltage characteristics and can function as power sources or electrical loads.

The system can control the switching of the first switch and the second switch by implementing zero current switching turn on and zero voltage switching turn off.

The DC-DC power conversion circuitry includes a third capacitor in parallel with the first switch and a fourth capacitor in parallel with the second switch to reduce losses due to stray resonance. The third capacitor and the fourth capacitor can reduce the average current through the DC-DC power conversion circuitry.

The DC-DC power conversion circuitry is configured to perform isolated inductive power transfer across the transformer and isolated capacitive power transfer across the first capacitor and the second capacitor.

The DC-DC power conversion circuitry can include gate driver circuitry integrated within the first switch and the second switch. The system can issue control signals to the gate driver circuitry to operate the first switch or the second switch.

In another exemplary implementation, a process can include: determining a direction of power transfer through DC-DC power conversion circuitry including a first switch and a second switch on either side of a transformer with a first capacitor and a second capacitor cross-connected across the transformer; aligning a primary side and a secondary side of the DC-DC power conversion circuitry based on the determined direction of power transfer; determining a quantity of power transfer through the DC-DC power conversion circuitry based on power and voltage characteristics of electrical components; determining a duty cycle and a switching frequency for the first switch or the second switch based on the quantity of power transferred through the DC-DC power conversion circuitry; and controlling switching of the first switch and the second switch. A non-transitory computer-readable storage medium including executable instructions, which when executed by circuitry, can cause the circuitry to perform the process.

A further exemplary implementation can include control circuitry that can determine a direction of power transfer through DC-DC power conversion circuitry including a first switch and a second switch on either side of a transformer with a first capacitor and a second capacitor cross-connected across the transformer; align a primary side and a secondary side of the DC-DC power conversion circuitry based on the determined direction of power transfer; determine a quantity of power transfer through the DC-DC power conversion circuitry based on power and voltage characteristics of electrical components; determine a duty cycle and a switching frequency for the first switch or the second switch based on the quantity of power transferred through the DC-DC power conversion circuitry; and control switching of the first switch and the second switch.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A-3E illustrate exemplary current flow paths in an isolated DC-DC power conversion circuit;

FIG. 7B is an exemplary graph of power transfer with respect to an amount of time that switches are turned on;

DETAILED DESCRIPTION

Figure 1:
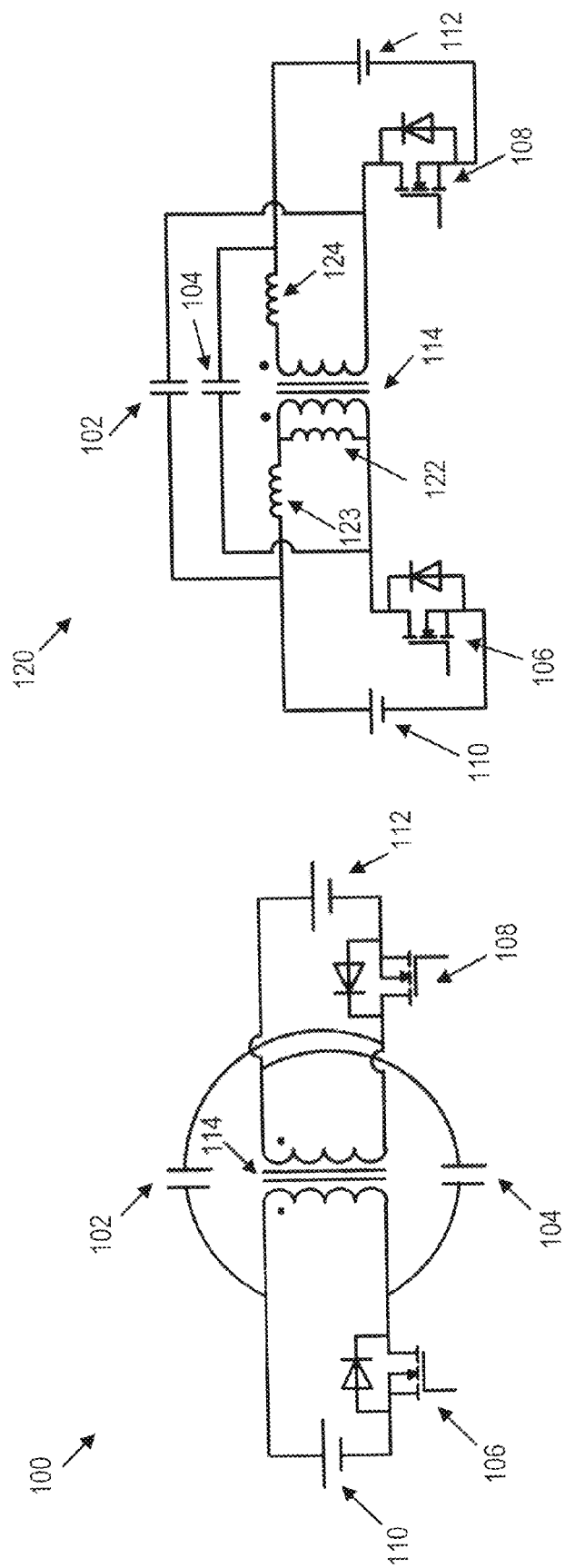
FIGS. 1A and 1B are exemplary illustrations of isolated DC-DC power conversion circuits.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1A is an exemplary illustration of an isolated DC-DC power conversion circuit 100. The isolated DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power supply 110, and the secondary side can include a secondary switch 108 and a secondary DC power supply 112. In an implementation, the capacitance values of the cross-connected capacitors 102 and 104 can be equal. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power supply 110 to the voltage of the secondary DC power supply 112.

In certain implementations, the isolated DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during battery cell balancing.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108. Details regarding bi-directional power transfer are discussed further herein with respect to FIG. 5.

FIG. 1B is another exemplary illustration of an isolated DC-DC power conversion circuit 120. In addition to the components described with respect to the isolated DC-DC power conversion circuit 100 of FIG. 1A, the isolated DC-DC power conversion circuit 120 can also include an exciting inductor 122 and leakage inductors 123 and 124. In some aspects, the leakage inductor 123 is on the primary side and the leakage inductor 124 is on the secondary side of the isolated DC-DC power conversion circuit 120. In some implementations, the magnetic core transformer 114 can be an ideal transformer, and the exciting inductor 122 and/or the leakage inductors 123 and 124 can illustrate an equivalent circuit for a real transformer. The exciting inductor 122 can be added in parallel with the primary side of the magnetic core transformer 114 in order to account for non-zero reluctance within the magnetic core transformer. In addition, the leakage inductors 123 and 124 can demonstrate how imperfect coupling within the magnetic core transformer 114 can affect the functionality of the isolate DC-DC power conversion circuit 120. In order to provide a more concise description, the isolated DC-DC power conversion circuit 100 and 120 can be used interchangeably throughout the disclosure.

Figure 2:
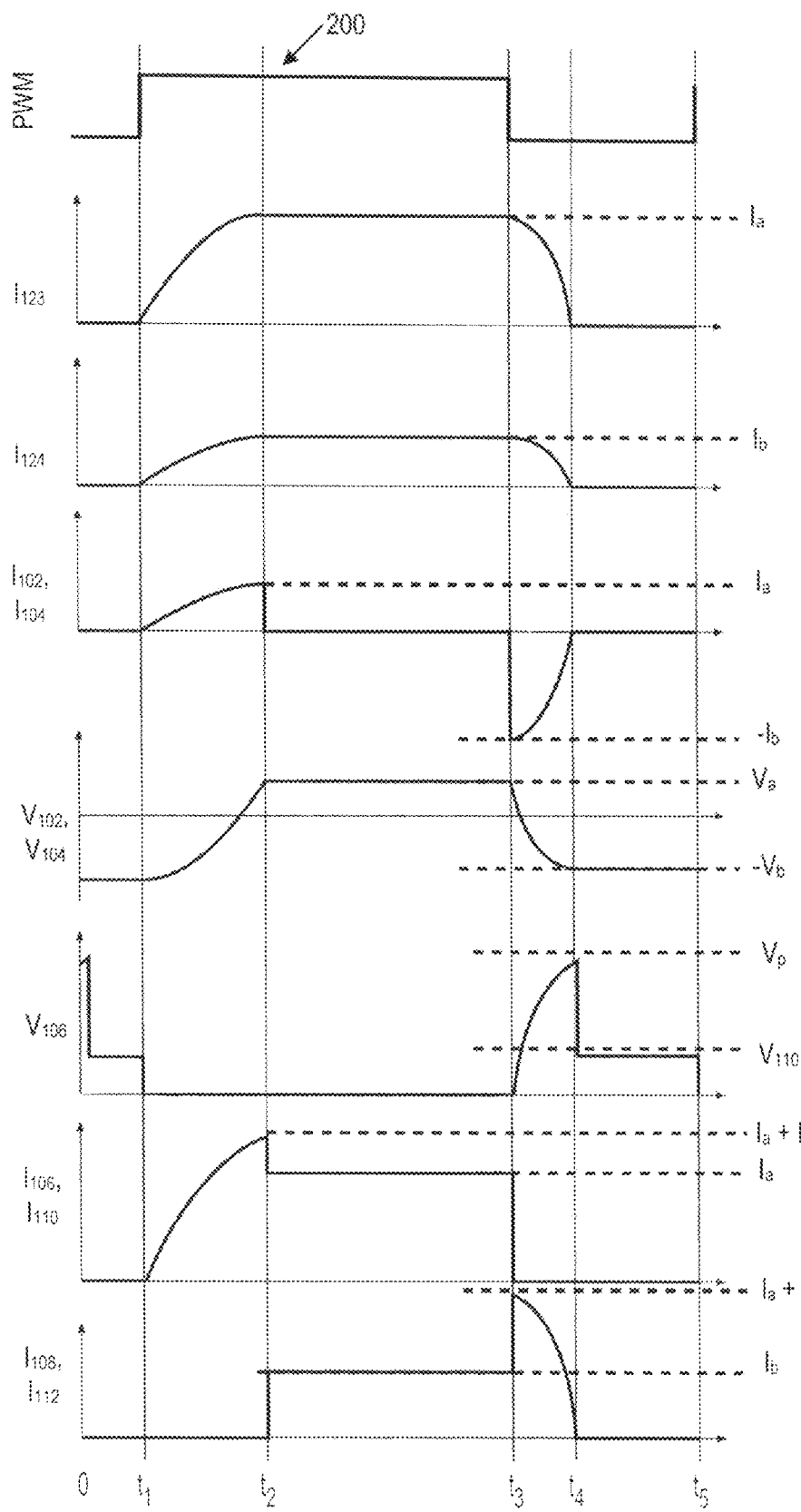
FIG. 2 is an exemplary illustration of current, voltage, and power waveforms of an isolated DC-DC power conversion circuit.

FIG. 2 is an exemplary illustration of current, voltage, and power waveforms of an isolated DC-DC power conversion circuit 120 with respect to time for one duty cycle of the primary switch 106. For example, graph 200 illustrates a duty cycle for the primary switch 106 that can be turned on at time $t_1$ and subsequently turned off at time $t_3$, according to some implementations. At time $t_5$, another duty cycle can commence. The amount of power transferred from the primary side to the secondary side of the isolated DC-DC power conversion circuit 100 can be modified by changing the duty cycle or the switching frequency of the primary switch 106. For example, to increase the amount of power transferred from the primary side to the secondary side of the isolated DC-DC power conversion circuit 120, the ratio of the amount of time that the primary switch 106 is turned on to the length of the period of the primary switch 106 is increased.

In some implementations, bi-directional power transfer can be performed by transferring power from the secondary side to the primary side of the isolated DC-DC power conversion circuit 120 by cycling the secondary switch 108 on and off. The description of the transfer of power from the secondary side to the primary side of the isolated DC-DC power conversion circuit 120 can also be applied to bi-directional power transfer in a straightforward way to one of ordinary skill in the art.

The duty cycle, switching frequency, and direction of power transfer within the isolated DC-DC power conversion circuit 120 can be controlled by one or more electronic control units (ECUs) or similar circuitry. For example, sensors can be installed within battery cells of an electric vehicle (EV) that can sense battery state of charge (SOC), voltage, and the like. In an implementation, the ECUs can process sensor data, display battery SOC information to a user, and send control signals to actuators that align the isolated DC-DC power conversion circuit 120. The ECUs can control the direction of power transfer as well as the quantity of power transferred by the isolated DC-DC power conversion circuit 120 by controlling the duty cycles and switching frequencies of the primary switch 106 and the secondary switch 108. The ECUs can also align the isolated DC-DC power conversion circuit 120 to perform functions determined by input from a user.

Between times 0 and $t_1$, the primary switch 106 is off, and capacitors 102 and 104 are negatively charged, according to some implementations. The voltage of the capacitors, $V_{102}$ and $V_{103}$ can be at a maximum negative value, $-V_b$, and no current is flowing through the isolated DC-DC power conversion circuit 120. In addition, the voltage at the primary switch $V_{106}$ can be equal to the voltage of the primary DC power supply $V_{110}$.

At time $t_1$, the primary switch 106 can be turned on. In some aspects, the primary switch 106 is turned on when the current through the primary switch $I_{106}$ is zero, which is a type of soft switching that can be referred to as zero current switching (ZCS). In some implementations, switching losses can be reduced when turning on the primary switch 106 by implementing ZCS. Between times $t_1$ and $t_2$, the capacitors 102 and 104 discharge energy through the leakage inductors 123 and 124, and LC resonance can occur. The voltage at the capacitors $V_{102}$ and $V_{104}$ can also increase until a maximum voltage of $V_a$ is reached, according to some aspects.

In some implementations, the current through the leakage inductors $I_{123}$ and $I_{124}$ can increase in a sinusoidal pattern due to series resonance of the isolated DC-DC power conversion circuit 100. The leakage inductor current $I_{123}$ can reach a maximum value at time $t_2$ of $I_a$. The current through the capacitors $I_{102}$ and $I_{104}$ can also increase in a sinusoidal pattern to a maximum value of $I_a$ at time $t_2$. In an implementation, $I_a$ can be the maximum amount of current on the primary side of the isolated DC-DC power conversion circuit 120. The leakage inductor current $I_{124}$ can reach a maximum value at time $t_2$ of $I_b$, which can be defined by the equation, $$I_b = \frac{I_a}{N}.$$

In an implementation, $I_b$ can be the maximum amount of current on the secondary side of the isolated DC-DC power conversion circuit 120. Due to the series resonance, the current through the primary DC power supply $I_{110}$ and the current through the primary switch $I_{106}$ can increase in a sinusoidal pattern to a maximum value of $I_a+I_b$ at time $t_2$.

FIG. 3A illustrates current flow paths in an isolated DC-DC power conversion circuit 120 between times $t_1$ and $t_2$, and FIG. 3B is an illustration of current flow paths through an equivalent circuit between times $t_1$ and $t_2$. Currents $I_{11}$ and $I_{12}$ illustrate current flow paths through the isolated DC-DC power conversion circuit 120 between times $t_1$ and $t_2$. Current $I_{11}$ can illustrate current flow on the primary side of the isolated DC-DC power conversion circuit 120, and current $I_{12}$ can illustrate how current flows between the primary and secondary sides of the isolated DC-DC power conversion circuit 120 through the cross-connected capacitors 102 and 104. The relationship between current $I_{11}$ and current $I_{12}$ can be defined by the equation, $I_{11}=NI_{12}$, according to certain embodiments. The resonant frequency, $\omega_1$, can be defined by the equation, $$\omega_1 = \frac{1}{\sqrt{2L_{124}\frac{C_{102}}{2}}} = \frac{1}{\sqrt{L_{124}C_{102}}}.$$

$L_{124}$ can be an inductance of leakage inductor 124 and $C_{102}$ can be a capacitance of capacitor 102, according to an implementation.

Referring back to FIG. 2, at time $t_2$, the secondary switch 108 diode turns on when the sum of the voltages at the leakage inductors 123 and 124 is equal to the sum of the voltage of the secondary DC power supply 112 and the voltage of the secondary switch 108 diode, which can be explained by the equation, $V_{123}+V_{124}=V_{112}+V_{Diode}$. When the secondary switch 108 diode turns on, capacitor currents $I_{102}$ and $I_{104}$ go to zero, and power is transferred from the primary side to the secondary side of the isolated DC-DC power converter circuit 120 through the magnetic core transformer 114. The power transfer through the magnetic core transformer 114 between times $t_2$ and $t_3$ can be referred to as inductive power transfer or magnetic power transfer, according to an implementation. The primary switch current $I_{106}$ and the current through the primary DC power supply $I_{110}$ are at a constant value $I_a$ during the inductive power transfer. The secondary switch current $I_{108}$ and the current through the secondary DC power supply $I_{112}$ are at a constant value $I_b$ during the inductive power transfer.

Figure 3C:
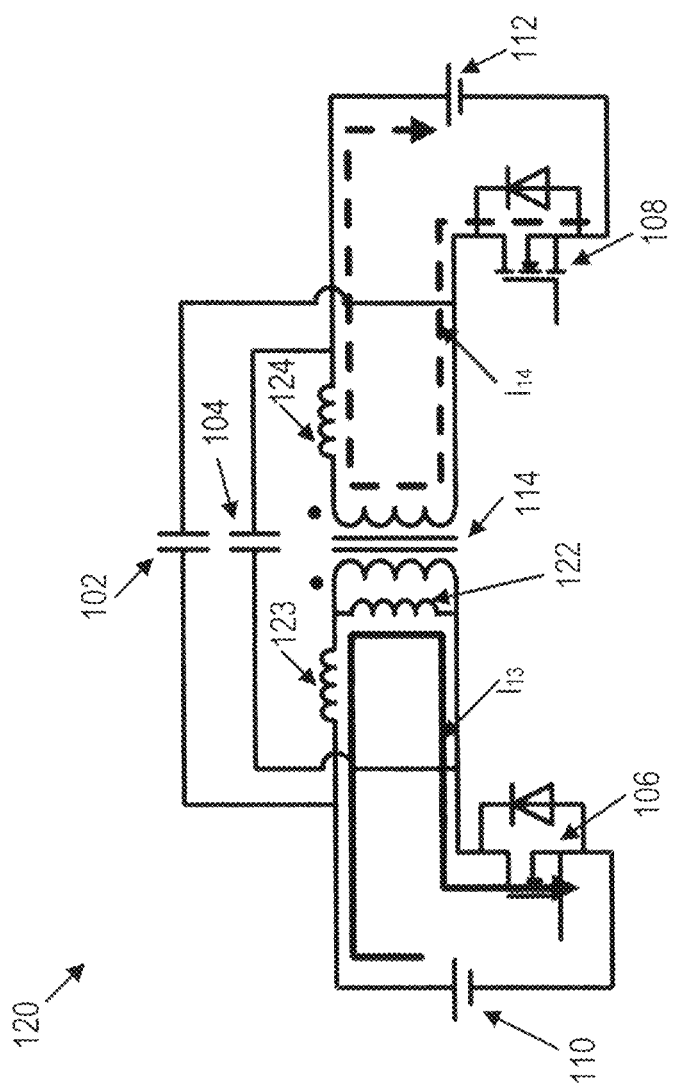

FIG. 3C illustrates current flow paths in an isolated DC-DC power conversion circuit 120 between times $t_2$ and $t_3$. $I_{13}$ illustrates how current flows from the primary DC power supply 110 through the magnetic core transformer 114, which causes inductive power transfer to the secondary side of the isolated DC-DC power conversion circuit 120, which can be illustrated by current $I_{14}$. The quantity of power, $P_1$, transferred from the primary side to the secondary side of the isolated DC-DC power converter circuit 120 between times $t_2$ and $t_3$ can be approximately described by the equation, $$P_1 \cong \frac{V_{110}I_a}{T}\left(DT - \frac{\pi}{2\omega_1}\right) \cong \frac{V_{112}I_b}{T}\left(T - \frac{\pi}{2\omega_1}\right).$$

$V_{110}$ is the voltage at the primary DC power supply 110 and $V_{112}$ can be the voltage at the secondary DC power supply 112. D can refer to the duty cycle of the primary switch 106, and T can refer to the period of the primary switch 106. In an implementation, control circuitry can control the duty cycle D and length of the period T based on the amount of power to be transferred from the primary side to the secondary side of the isolated DC-DC power conversion circuit 120.

Referring back to FIG. 2, at time $t_3$, the primary switch 106 is turned off when the voltage at the primary switch $V_{106}$ is zero, which can be referred to as zero voltage switching (ZVS). In some implementations, switching losses can be reduced when turning off the primary switch 106 by implementing ZVS. Power can be transferred from the primary side to the secondary side of the isolated DC-DC power converter circuit 120 through capacitors 102 and 104. Between times $t_3$ and $t_4$, the isolated DC-DC power converter circuit 100 can experience series resonance at a frequency, $\omega_2$, which can be described by the equation, $$\omega_2 = \frac{1}{\sqrt{2\frac{C_{102}}{2}L_{123}}} = N\omega_1.$$

In addition, the voltage at the primary switch $V_{106}$ increases in a sinusoidal fashion between times $t_3$ and $t_4$ until voltage $V_p$ is reached at time $t_4$. In some implementations voltage $V_p$ can be described by equation, $V_p = 2V_a + 2V_b$.

Figure 3E:
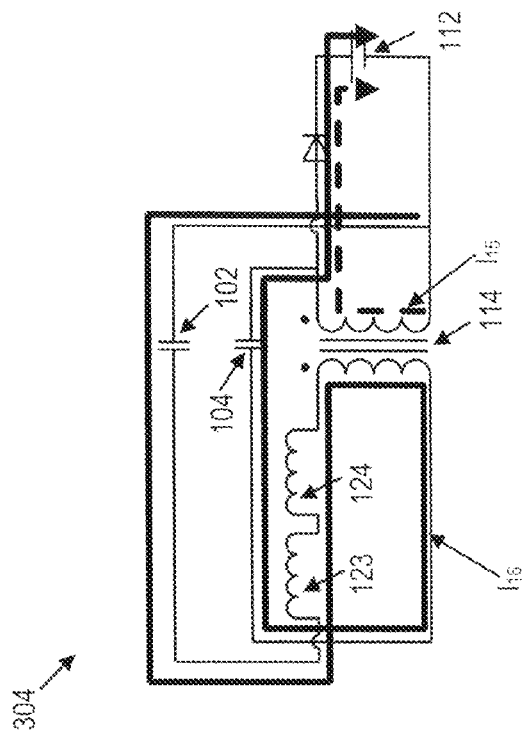
Figure 3D:
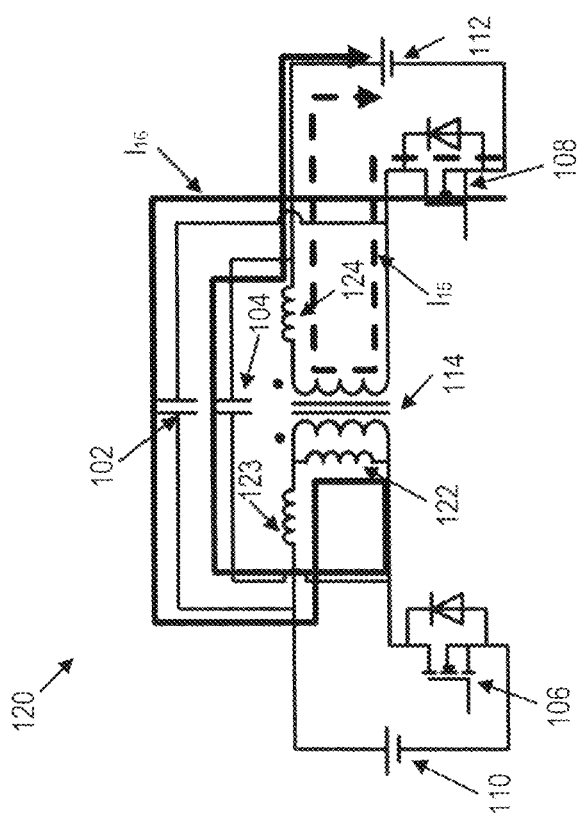

FIG. 3D illustrates current flow paths in an isolated DC-DC power conversion circuit 120 between times $t_3$ and $t_4$, and FIG. 3E is an illustration of current flow paths through an equivalent circuit between times t3 and t4. Currents $I_{15}$ and $I_{16}$ illustrate the current flow path through the isolated DC-DC power conversion circuit 120 between times $t_3$ and $t_4$. Current $I_{15}$ can illustrate current flow on the secondary side of the isolated DC-DC power conversion circuit 120, and current $I_{16}$ can illustrate how current flows between the primary and secondary sides of the isolated DC-DC power conversion circuit 120 through the cross-connected capacitors 102 and 104 to accomplish capacitive power transfer. The relationship between current $I_{15}$ and current $I_{16}$ can be defined by the equation, $I_{16} = NI_{15}$, according to certain implementations. Due to the series resonance, the leakage inductor currents $I_{123}$ and $I_{124}$ decrease in a sinusoidal pattern until the leakage inductor currents $I_{123}$ and $I_{124}$ go to zero at time t4 and the series resonance ends. In addition, capacitor currents $I_{102}$ and $I_{104}$ go from a minimum value of $-I_b$ to zero between times t3 and t4, and the capacitor voltages $V_{102}$ and $V_{104}$ become negatively charged and reach a voltage of $V_b$ at time $t_4$. Current through the secondary switch $I_{108}$ and secondary DC power supply $I_{112}$ can decrease in a sinusoidal pattern from a maximum value of $I_a + I_b$ at time $t_3$ to zero at time $t_4$.

The quantity of power, $P_2$, transferred from the primary to the secondary side of the isolated DC-DC power converter circuit 120 between times $t_3$ and $t_4$ can be approximately described by the equation, $$P_2 \cong \frac{V_{112}(I_a + I_b)}{T\omega_2} \cong \frac{V_{112}I_b(1+N)}{T\omega_2}.$$

At time $t_4$, the isolated DC-DC power converter circuit 120 is returned to a status that is equal to the circuit status at time 0. For example, the capacitor voltages $V_{102}$ and $V_{104}$ at time $t_4$ can be equal to the capacitor voltage at time 0.

In some implementations, the relationship between $I_b$ and $V_a$ can be described by the equation, $$I_b = V_a \sqrt{2(1+A^2)\frac{C_{102}}{L_{123}}}, \text{ where } A = \frac{\{2\omega NDT - 2(N+1) + \pi\}}{\{2\omega N(1-D)T + 2(N+1) - \pi\}}.$$

$L_{123}$ can be an inductance of leakage inductor 123, according to an implementation. Therefore, the total power transferred from the primary side to the secondary side of the isolated DC-DC power conversion circuit 120 can be approximately described by the equation, $$P_{ps} \cong P_1 + P_2 \cong \left\{\frac{2(1+N) - N\pi}{2\omega_2} + DT\right\}\frac{V_{112}I_b}{T}.$$

Figure 4:
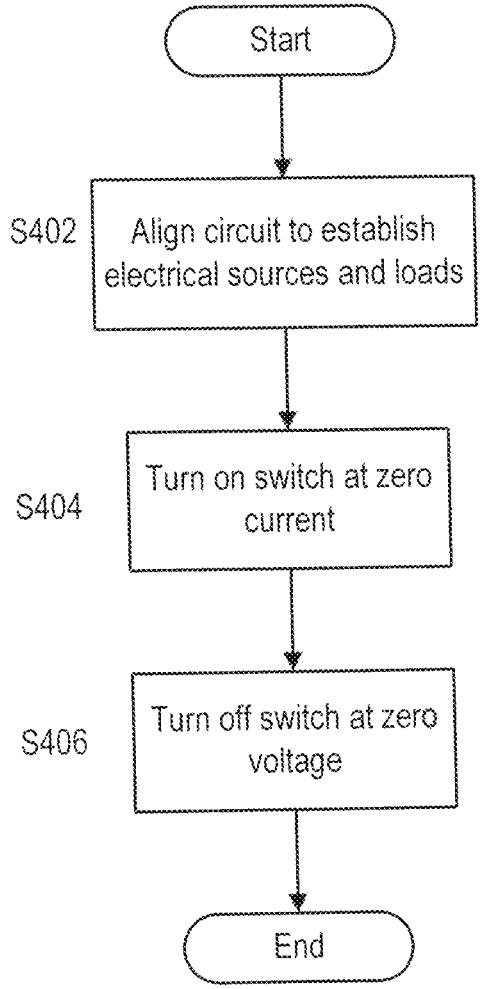
FIG. 4 is an exemplary flowchart of an isolated DC-DC power conversion process.

FIG. 4 is an exemplary flowchart of an isolated DC-DC power conversion process 400. The isolated DC-DC power conversion process 400 can be controlled by one or more ECUs or similar circuitry. Sensors installed within one or more battery cells and other electrical components of an EV power transfer system can sense battery SOC, voltage, current, and the like. The ECUs can process sensor data, display electric power module information to a user, and send control signals to actuators that align the EV power transfer system to maintain continuous power to the electrical components. In some implementations, the actuators send control signals to control the duty cycle and switching frequency of the primary switch 106 and secondary switch 108, operating frequency, and direction of power transfer of the isolated DC-DC power conversion circuit 120. The ECUs can also align a plurality of isolated DC-DC power conversion circuits to perform power transfer among a one or more sources and/or loads within an EV power transfer system.

At step S402, control signals are sent to align at least one isolated DC-DC power conversion circuit 120 based on a desired direction of power transfer. In some implementations, the electrical components are connected at the primary DC power supply 110 and secondary DC power supply 112 and can function as either power sources or electrical loads. For example, a battery cell in an electrical system of an EV can function as a power source to power electrical components of a vehicle, such as brakes, audio systems, and the like. The battery cell can also function as an electrical load during battery cell balancing among a plurality of battery cells. The control circuitry can send control signals to voltage sensors, current sensors, and timers as well as to the primary switch 106 and the secondary switch 108 to align the isolated DC-DC power conversion circuit 120 for the desired direction of power transfer.

At step S404, if power is being transferred from the primary side to the secondary side of the isolated DC-DC power conversion circuit 120, a control signal is sent to turn on the primary switch 106 when the current through the primary switch $I_{106}$ is zero to implement ZCS. In implementations where power is transferred from the secondary side to the primary side of the isolated DC-DC power conversion circuit 120, a control signal is sent to turn on the secondary switch 108 when the current though the secondary switch $I_{108}$ is zero to implement ZCS. Details regarding power transfer from the secondary side to the primary side of the isolated DC-DC power conversion circuit 120 are discussed further herein. The control circuitry can receive sensor data relating to current at the primary switch 106 to determine when to send the control signal to turn on the primary switch 106. In an implementation, the control signal is sent to a gate driver circuit that turns on the primary switch 106. In some aspects, the gate driver circuits can be integrated into the primary switch 106 and the secondary switch 108. According to some implementations, the time at which the primary switch 106 is turned on can be the beginning of the active signal time for the duty cycle of the primary switch 106.

The amount of power transferred from the primary side to the secondary side of the isolated DC-DC power conversion circuit 120 can be modified by changing the duty cycle of the primary switch 106. To increase the amount of power transferred from the primary side to the secondary side of the isolated DC-DC power conversion circuit 120, the ratio of the active signal time for the primary switch 106 to the overall length of a period for the primary switch 106 is increased. To decrease the amount of power transferred from the primary side to the secondary side of the isolated DC-DC power conversion circuit 120, the ratio of the active signal time for the primary switch 106 to the overall length of a period for the primary switch 106 is decreased. The quantity of power that is transferred from the primary side to the secondary side of the isolated DC-DC power conversion circuit can be determined based on the power and voltage characteristics of the electrical components in the electrical system.

When the sum of the voltage across the leakage inductors 123 and 124 is equal to the sum of the voltage of the secondary DC power supply $V_{112}$ and the voltage of the secondary switch 108 diode, the secondary switch 108 diode turns on. When the secondary switch 108 diode turns on, capacitor currents $I_{102}$ and $I_{104}$ go to zero, and power is transferred from the primary side to the secondary side of the isolated DC-DC power converter circuit 120 through the magnetic core transformer 114. The power transfer through the magnetic core transformer 114 can be referred to as inductive power transfer, according to an implementation. In implementations where power is being transferred from the secondary side to the primary side of the isolated DC-DC power conversion circuit 120, a control signal is sent to turn on the secondary switch 108 when the current through the secondary switch $I_{108}$ is zero.

At step S406, a control signal is sent to turn off the primary switch 106 to implement ZVS when the voltage at the primary switch 106 is zero, which can end the active signal time for the duty cycle of the primary switch 106. The control circuitry can receive sensor data relating to voltage at the primary switch 106 to determine when to send the control signal to turn off the primary switch 106. In some implementations, capacitive power transfer can occur from the primary side to the secondary side of the isolated DC-DC power conversion circuit 120 through the cross-connected capacitors 102 and 104 until the current through the inductors $I_{123}$ and $I_{124}$ goes to zero and the capacitors 102 are negatively charged.

Figure 5:
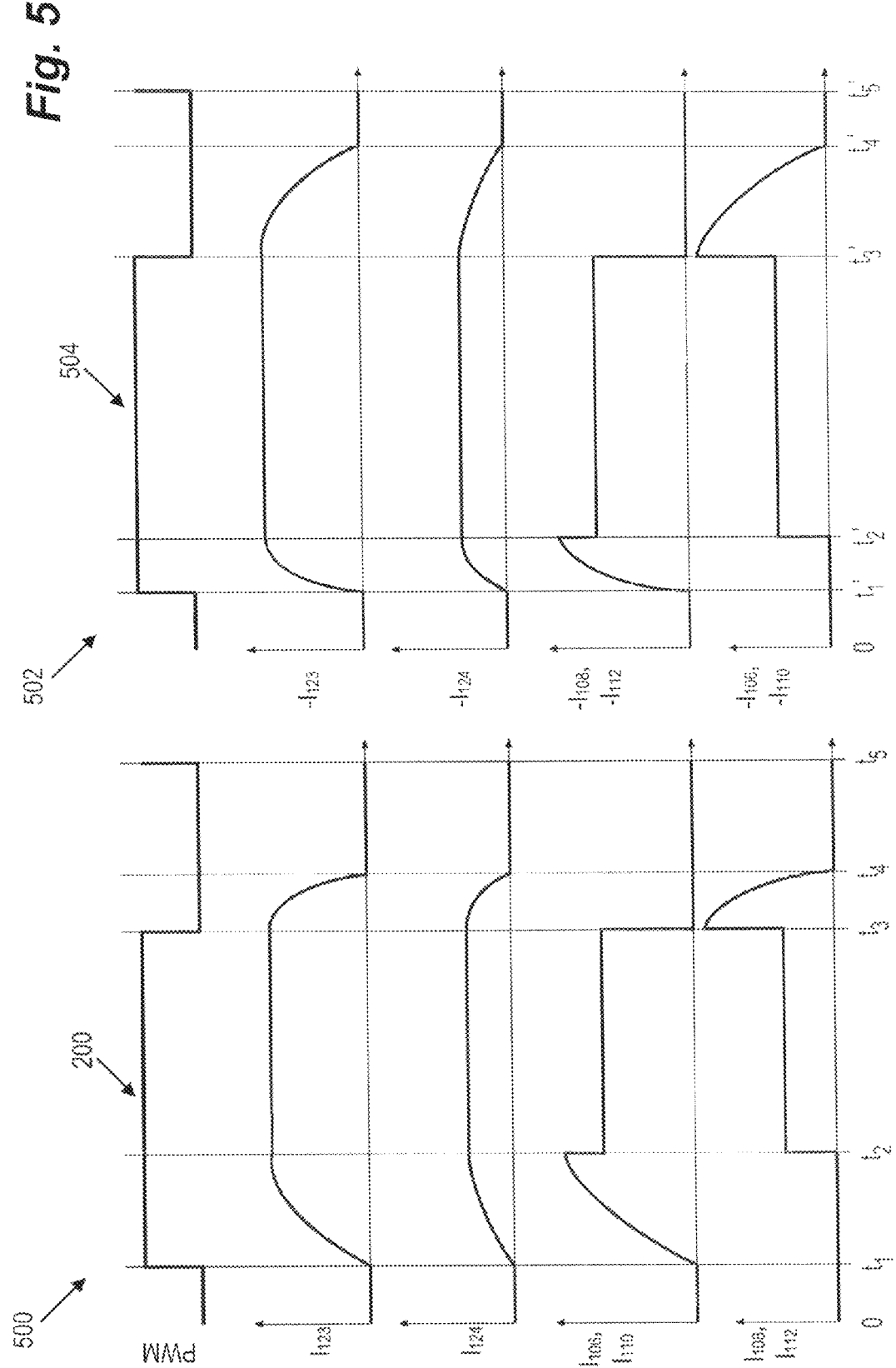
FIG. 5 is an exemplary illustration of bi-directional power transfer through isolated DC-DC power conversion circuits.

FIG. 5 is an exemplary illustration of bi-directional power transfer through an isolated DC-DC power conversion circuit 120. Current waveforms 500 illustrate power transfer from the primary side to the secondary side of the isolated DC-DC power conversion circuit 120, and waveforms 502 illustrate power transfer from the secondary side to the primary side of the isolated DC-DC power conversion circuit 120. Due to the symmetrical configuration of the isolated DC-DC power conversion circuit 120 on each side of the magnetic core transformer 114, bi-directional power transfer can be performed. In an implementation, the direction of power transfer can be based on whether the primary switch 106 or the secondary switch 108 is cycled on and off. The quantity of power transferred can vary based on the duty cycle and period of the switches.

To transfer power from the primary side to the secondary side of the isolated DC-DC power conversion circuit 120, the primary switch 106 can be turned on at time $t_1'$ and off at time $t_3'$, according to waveform 200, and inductive and capacitive power transfer can be performed. Currents $I_{123}$, $I_{124}$, $I_{106}$, $I_{110}$, $I_{108}$, and $I_{112}$ can describe how power is transferred from the primary side to the secondary side of the isolated DC-DC power conversion circuit 120, as previously discussed.

To transfer power from the secondary side to the primary side of the isolated DC-DC power conversion circuit 120, the secondary switch 108 can be turned on at time $t_1'$ and turned off at time $t_3'$, according to waveform 504. Currents $-I_{123}$, $-I_{124}$, $-I_{108}$, $-I_{112}$, $-I_{106}$, and $-I_{110}$ can describe how power is transferred from the primary side to the secondary side of the isolated DC-DC power conversion circuit 120. Between times 0 and $t_1'$, the secondary switch 108 is off, and capacitors 102 and 104 are negatively charged, according to some implementations.

At time $t_1'$, the secondary switch 108 can be turned on when the current through the secondary switch $-I_{108}$ and the current though the leakage inductor $-I_{124}$ are approximately zero to implement ZCS soft switching. Between times $t_1'$ and $t_2'$, the capacitors 102 and 104 discharge energy through the leakage inductors 123 and 124, and LC resonance can occur. In addition, the current through the leakage inductors $-I_{123}$ and $-I_{124}$ and the current through the secondary switch $-I_{108}$ and the secondary DC power supply $-I_{112}$ can increase in a sinusoidal pattern due to the series resonance.

At time $t_2'$, the primary switch 106 diode turns on when the sum of the voltages at the leakage inductors 123 and 124 is equal to the sum of the voltage of the primary DC power supply 110 and the voltage of the secondary switch 106 diode, which can be explained by the equation, $V_{123}+V_{124}=V_{110}+V_{Diode}$. When the primary switch 106 diode turns on, capacitor currents $I_{102}$ and $I_{104}$ go to zero, and power is transferred from the secondary side to the primary side of the isolated DC-DC power converter circuit 120 through the magnetic core transformer 114. The power transfer through the magnetic core transformer 114 between times $t_2'$ and $t_3'$ can be referred to as inductive power transfer, according to an implementation.

At time $t_3'$, the primary switch 106 is turned off when the voltage at the primary switch $V_{106}$ is zero to implement ZVS soft switching. Power can be transferred from the secondary side to the primary side of the isolated DC-DC power converter circuit 120 through capacitors 102 and 104 between times $t_3'$ and $t_4'$, which can be referred to as capacitive power transfer. Due to series resonance, the current through the leakage inductors $-I_{123}$ and $-I_{124}$ and the current through the primary switch $-I_{106}$ and the primary DC power supply $-I_{110}$ can decrease in a sinusoidal pattern until the currents reach approximately zero at time $t_4'$. At time $t_5'$, another duty cycle can commence. According to some implementations, the quantity of power transferred from the secondary to the primary side of the isolated DC-DC power conversion circuit can be approximately described by the equation, $$P_{sp} \cong \left\{ \frac{2N(1+N) - \pi}{2\omega_2} + DT \right\} \frac{V_{112} I_b}{T}.$$

Figure 6:
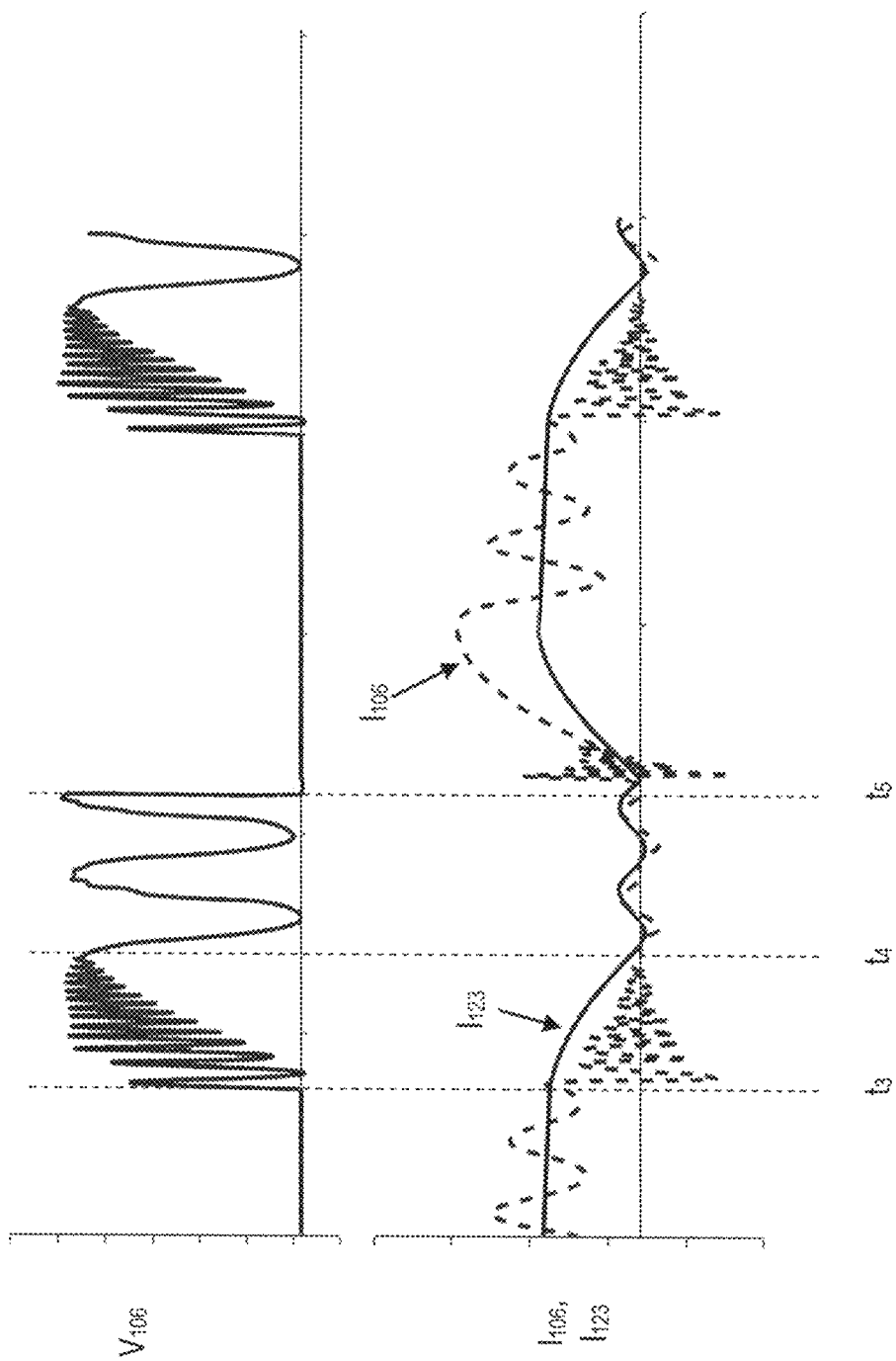
FIG. 6 is an exemplary illustration of stray resonance in an isolated DC-DC power conversion circuit.

FIG. 6 is an exemplary illustration of stray resonance in an isolated DC-DC power conversion circuit 120. Real circuits can experience losses in the form of stray resonance when a switch is turned off, which can be described as a ringing in the voltage and current waveforms of a circuit due to undesired interactions between resonating components, such as capacitors and inductors. In some implementations, turn-off losses due to stray resonance can be explained by the equation, $$E = \frac{1}{2} C V_{106}^2,$$

where C is the capacitance of the component that is contributing to the stray resonance. The stray resonance can affect the primary switch voltage $V_{106}$, primary switch current $I_{106}$, and the leakage inductor current $I_{123}$. In some implementations where the primary switch 106 is turned off at time $t_3$, primary stray resonance can occur between the leakage inductor 123 and capacitor 102 between times $t_3$ and $t_4$.

Secondary stray resonance can occur between the leakage inductor 123 and an existing capacitance in the primary switch 106 between times $t_4$ and $t_5$. In some aspects where the existing capacitance of the primary switch 106 is much less than the capacitance of capacitor 102, the secondary stray resonance can be taken into account. In some implementations, the existing capacitance of the primary switch 106 that is much less than the capacitance of capacitor 102 can be greater than one hundred times smaller than the capacitance of capacitor 102. The secondary stray resonance can cause the primary switch current $I_{106}$ and the leakage inductor current $I_{123}$ to be a value other than zero at time $t_5$, which can be the time at which the primary switch 106 can be turned on to begin a subsequent duty cycle. In some aspects, the time at which the primary switch 106 is turned on can be modified in order to implement ZCS at primary switch 106 turn on.

The effects of the primary and secondary stray resonance can also be seen when transferring power from the secondary side to the primary side of the isolated DC-DC power conversion circuit 120. For example, stray resonance can affect the secondary switch voltage $V_{108}$, primary switch current $I_{108}$, and the leakage inductor current $I_{124}$. In some implementations where the secondary switch 108 is turned off at time $t_3'$, primary stray resonance can occur between the leakage inductor 124 and capacitor 104 between times $t_3'$ and $t_4'$. In addition, secondary stray resonance can occur between the leakage inductor 124 and an existing capacitance in the secondary switch 108 between times $t_4'$ and $t_5'$.

Figure 7A:
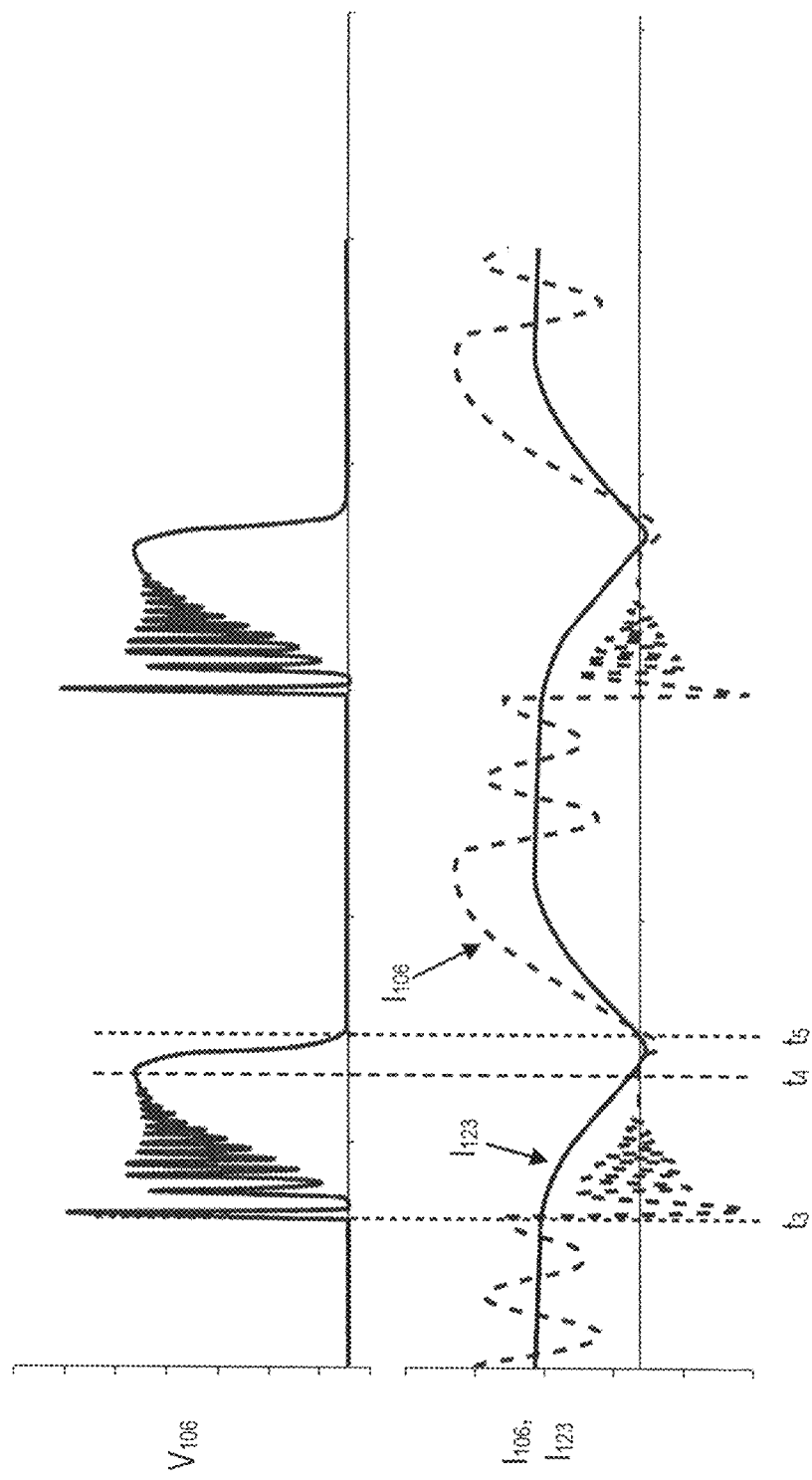
FIG. 7A is an exemplary illustration of stray resonance mitigation via duty cycle modification.

FIG. 7A is an exemplary illustration of graphs of stray resonance reduction via duty cycle modification in an isolated DC-DC power conversion circuit 120. As previously discussed, primary and secondary stray resonance can result in real circuits when a switch is turned off due to undesired interactions between resonating components. The stray resonance can affect the primary switch voltage $V_{106}$, primary switch current $I_{106}$, and the leakage inductor current $I_{123}$. In some implementations, if the primary switch 106 is turned off at time $t_3$, then primary stray resonance can occur between times $t_3$ and $t_4$, which can be seen in the ringing of the primary switch voltage $V_{106}$ waveform between times $t_3$ and $t_4$. In order to implement ZCS for the subsequent duty cycle, the time $t_5$ at which the subsequent duty cycle begins can be moved to an earlier time such that the length of time between time t4 and t5 is reduced. In an implementation, by moving time $t_5$ to an earlier time, the primary switch 106 can be turned on when the primary switch current $I_{106}$ and the leakage inductor current $I_{123}$ are zero, and ZCS soft switching can be implemented when the primary switch 106 is turned on.

By moving the time $t_5$ at which the subsequent duty cycle begins to an earlier time, the duty cycle for the primary switch 106 can be increased because the fraction of time that the primary switch 106 is turned off during a period is decreased. In some implementations, increasing the duty cycle of the primary switch 106 can increase the quantity of power transferred from the primary side to the secondary side of the isolated DC-DC power conversion circuit 120. In addition, the amount of current flow through the isolated DC-DC power conversion circuit 120 is increased when the duty cycle of the primary switch 106 is increased. For example, mitigating the effects of secondary stray resonance by moving time $t_5$ to an earlier time can be used when transferring power to electrical loads that consume a larger amount of power than other electrical loads in the EV, such as brakes, steering, and/or heaters.

Figure 7B:
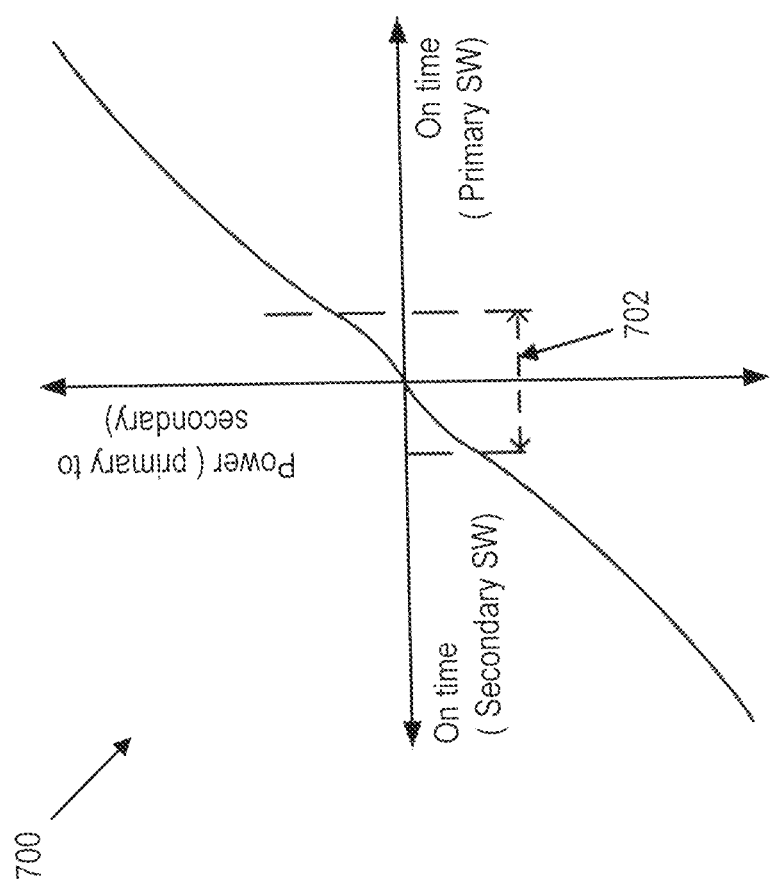

FIG. 7B is an exemplary graph of power transfer from the primary side to the secondary side of the isolated DC-DC power conversion circuit 120 with respect to an amount of time that the primary switch 106 or the secondary switch 108 is turned on. In some implementations, an amount of time that the primary switch 106 or the secondary switch 108 is turned off ($t_3$-$t_5$) is kept constant by the control circuitry. The amount of time that the primary switch 106 or secondary switch 108 is turned on can be varied based on the quantity of power to be transferred while maintaining ZCS turn-on and ZVS turn-off. For example, to increase the quantity of power transferred from the primary side to the secondary side of the isolated DC-DC power conversion circuit 120, the amount of time that the primary switch 106 is turned on is increased. In addition, in some implementations, time frame 702 is less than the amount of time that the primary switch 106 or the secondary switch 108 is turned off ($t_3$-$t_5$), and only capacitive power transfer occurs across the isolated DC-DC power conversion circuit.

Figure 8:
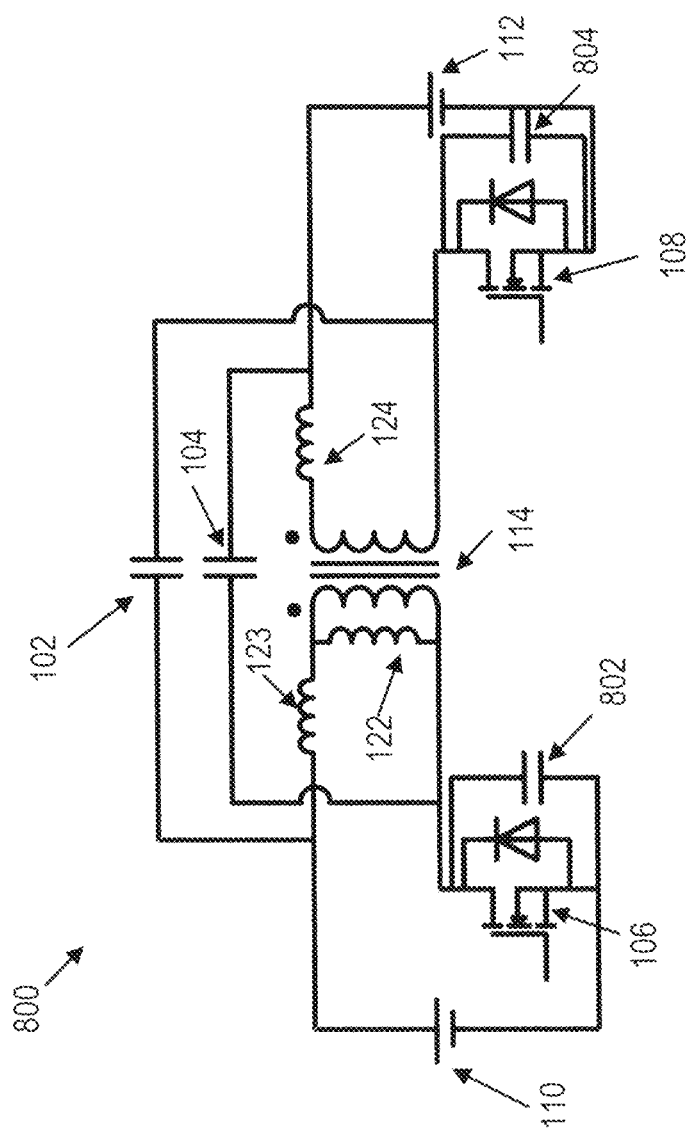
FIG. 8 is an exemplary illustration of an isolated DC-DC power conversion circuit.

FIG. 8 is an exemplary illustration of an isolated DC-DC power conversion circuit 800. In addition to the circuit components described with respect to the isolated DC-DC power conversion circuits 100 and 120 with respect to FIGS. 1A and 1B, the isolated DC-DC power conversion circuit 800 can also include capacitors 802 and 804. The capacitor 802 can be connected in parallel with the primary switch 106, and the capacitor 804 can be connected in parallel with the secondary switch 108. In some implementations, the circuit losses at switch turn-off attributed to the stray resonance can be reduced by including the capacitors 802 and 804 in the isolated DC-DC power conversion circuit 800.

The capacitor 802 can reduce the losses due to stray resonance when power is being transferred from the primary side to the secondary side of the isolated DC-DC power conversion circuit 800. For example, the combined capacitance of the existing capacitance within the primary switch 106 and the capacitor 802 in parallel can be larger than the existing capacitance within the primary switch 106, which can cause the primary and secondary stray resonance to be reduced. In addition, the capacitor 804 can reduce the losses due to stray resonance when power is being transferred from the secondary side to the primary side of the isolated DC-DC power conversion circuit 800. For example, the combined capacitance of the existing capacitance within the secondary switch 108 and the capacitor 804 in parallel can be larger than the existing capacitance within the primary switch 108, which can cause the primary and secondary stray resonance to be reduced.

Figure 9:
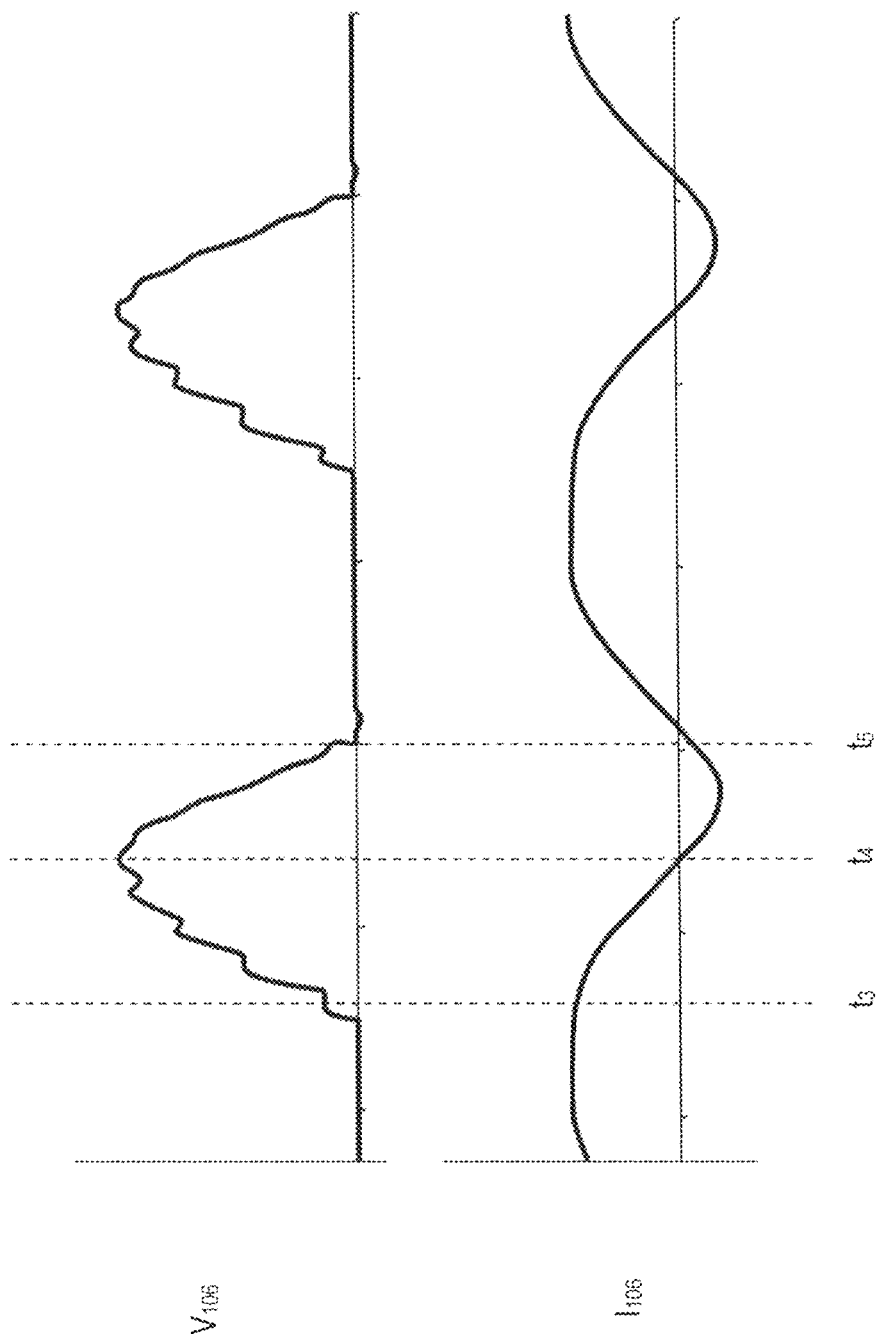
FIG. 9 is an exemplary illustration of stray resonance mitigation via parallel capacitors.

FIG. 9 is an exemplary illustration of graphs of stray resonance reduction via parallel capacitors 802 and 804. The stray resonance can affect the primary switch voltage $V_{106}$ and the leakage inductor current $I_{123}$. In the example illustrated by FIG. 9, power is transferred from the primary side to the secondary side of the isolated DC-DC power conversion circuit 800. The primary switch 106 of the isolated DC-DC power conversion circuit 800 can be turned off at time $t_3$ and can be subsequently turned on at time $t_5$ to begin another duty cycle. In an implementation, the turn-off losses due to the primary stray resonance between times $t_3$ and $t_4$ can be reduced.

In addition, the effects of the secondary stray resonance between times $t_4$ and $t_5$ can be reduced by connecting the capacitor 802 in parallel with the primary switch 106. The capacitance value of the capacitor 802 can be determined based on providing approximately zero leakage inductor current $I_{123}$ at a time when the primary switch 106 can be turned on in order to implement ZCS. In an implementation, the average current of the isolated DC-DC power conversion circuit 800 during a duty cycle can be reduced by connecting the capacitor 802 in parallel with the primary switch 106. The effects of the primary and secondary stray resonance can also be reduced when transferring power from the secondary side to the primary side of the isolated DC-DC power conversion circuit 800. For example, the capacitor 804 can be connected in parallel with the secondary switch 108 to reduce the primary and secondary stray resonance and allow ZCS when the secondary switch 108 is turned on.

Figure 10:
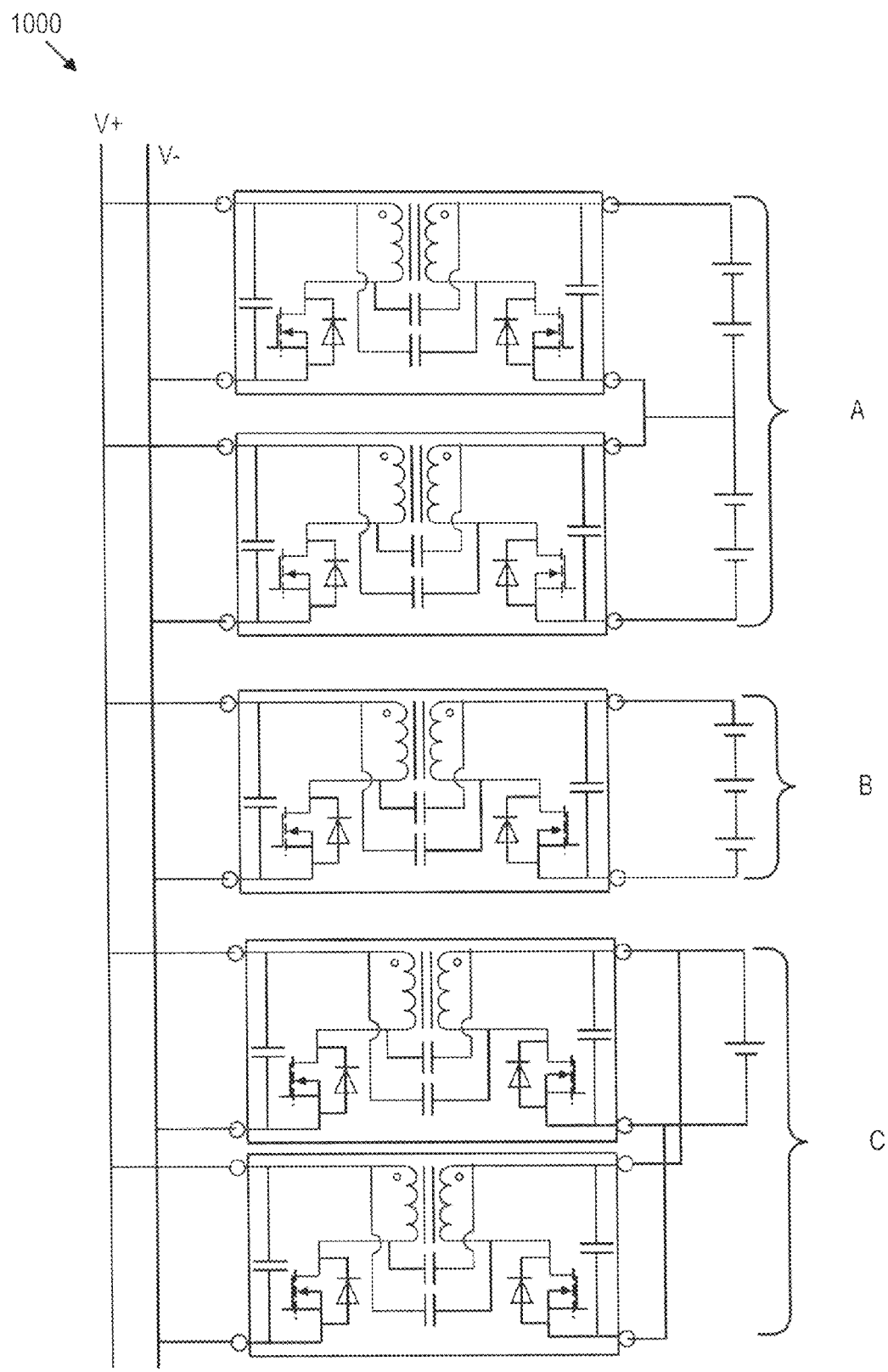
FIG. 10 is an exemplary illustration of a distributed power system.

FIG. 10 is an exemplary illustration of a distributed power system 1000. In an implementation, the distributed power system 1000 can provide power to one or more electrical loads of an EV. The primary side of at least one isolated DC-DC power conversion circuit in the distributed power system 1000 can be connected to a common terminal that includes a positive terminal V+ and a negative terminal V−. The secondary sides of the isolated DC-DC power conversion circuits can be connected to electrical components A, B, and C, which can have unequal power and voltage characteristics. The isolated DC-DC power conversion circuits can be combined in series and parallel configurations so that the distributed power system 1000 can provide power to electrical loads with unequal power and voltage characteristics. In addition, due to the symmetrical configuration of the isolated DC-DC power conversion circuits on each side of the magnetic core transformer 114, bi-directional power transfer can be performed, and the electrical components A, B, and C can function as power sources or electrical loads.

For example, for electrical component A, the secondary sides of two isolated DC-DC power conversion circuits can be cascaded in a series configuration. The series configuration of the isolated DC-DC power conversion circuits enables the distributed power system 1000 to transfer power between electrical components having higher voltage and power characteristics than other electrical loads in the distributed power system 1000. In the example of the distributed power system 1000 of an EV, electrical component A can include an AC/DC converter for battery charging and discharging operations.

In an implementation, the power and voltage characteristics for electrical component B can be less than the power and voltage characteristics of electrical component A, and one isolated DC-DC power conversion circuit may be used to transfer power between the common terminal and the electrical component B. In the example of the distributed power system 1000 of an EV, electrical component B can include one or more battery cells of a battery module.

For electrical component C, the secondary sides of two isolated DC-DC power conversion circuits can be connected in a parallel configuration. The parallel configuration of the isolated DC-DC power conversion circuits enables the distrusted power system 1000 to transfer power between electrical components having power characteristics that are higher than other electrical components in the distributed power system 1000. For example, in some implementations, the electrical loads having higher power characteristics can include components such as electric brakes, power steering, and/or heaters.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 11:
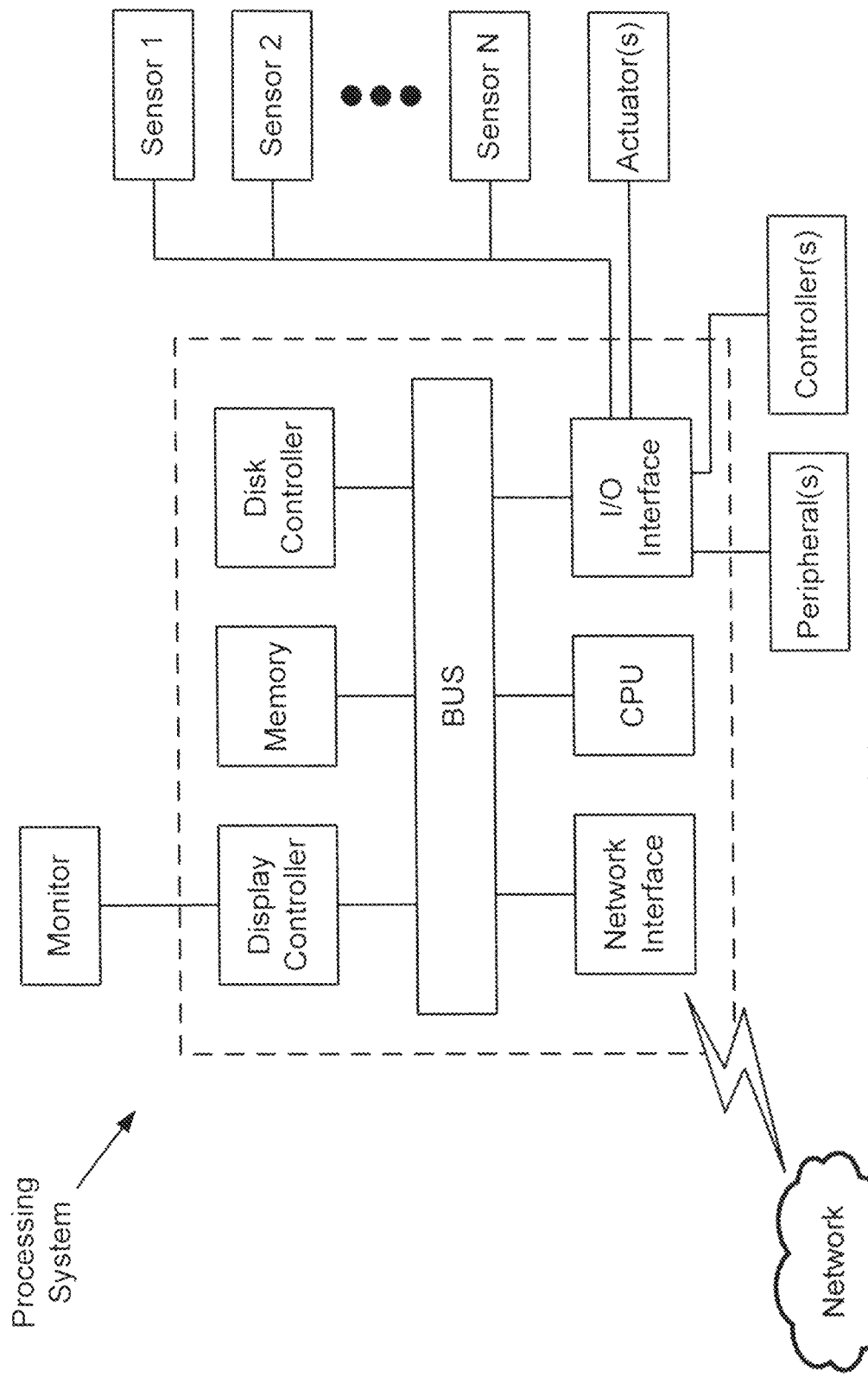
FIG. 11 schematically illustrates a processing system for a processing system, such as a controller and/or a computer system.

FIG. 11 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 ... N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the isolated DC-DC power conversion circuit 120 or distributed power system. For example, the user can use the controller to set up default periods and duty cycles for the primary switch 106 and the secondary switch 108 of the isolated DC-DC power conversion circuit 120. The I/O interface can also provide an interface for outputting control signals to one or more actuators to control various actuated components, including gate driver circuits and other circuitry in the isolated DC-DC power conversion circuit 120. In some implementations, the actuators send control signals to control the duty cycle or switching frequency of the primary switch 106 and secondary switch 108, operating frequency, and direction of power transfer of the isolated DC-DC power conversion circuit 120.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system, comprising:
DC-DC power conversion circuitry configured to perform bi-directional power transfer including a first switch and a second switch on either side of a transformer with a first capacitor and a second capacitor configured for isolated capacitive power transfer cross-connected across the transformer; and
control circuitry configured to:
  determine a direction of power transfer through the DC-DC power conversion circuitry,
  align a primary side and a secondary side of the DC-DC power conversion circuitry based on the determined direction of power transfer,
  determine a quantity of power transfer through the DC-DC power conversion circuitry based on power and voltage characteristics of electrical components, determine a duty cycle and a switching frequency for the first switch or the second switch based on the quantity of power transfer through the DC-DC power conversion circuitry, and control switching of the first switch and the second switch by implementing zero current switching turn on and zero voltage switching turn off.

2. The system of claim 1, wherein the control circuitry is further configured to determine the direction of power transfer by selecting the first switch or the second switch to cycle on and off.

3. The system of claim 1, wherein the control circuitry is further configured to increase the duty cycle of the first switch or the second switch to increase the quantity of power transferred through the DC-DC power conversion circuitry.

4. The system of claim 3, wherein the control circuitry is further configured to decrease the duty cycle of the first switch or the second switch to decrease the quantity of power transferred through the DC-DC power conversion circuitry.

5. The system of claim 1, wherein the control circuitry is further configured to modify the duty cycle of the first switch or the second switch to reduce losses due to stray resonance.

6. The system of claim 5, wherein the duty cycle is modified by decreasing a length of time that the primary switch or the secondary switch is off.

7. The system of claim 1, wherein a plurality of DC-DC power conversion circuitry is connected in series or parallel in a distributed power system to transfer power between electrical components.

8. The system of claim 7, wherein the plurality of DC-DC power conversion circuitry connected in series or parallel transfer power between the electrical components with unequal power and voltage characteristics.

9. The system of claim 8, wherein the electrical components function as power sources or electrical loads.

10. The system of claim 1, wherein the DC-DC power conversion circuitry includes a third capacitor in parallel with the first switch and a fourth capacitor in parallel with the second switch to reduce losses due to stray resonance.

11. The system of claim 10, wherein the third capacitor and the fourth capacitor reduce the average current through the DC-DC power conversion circuitry.

12. The system of claim 1, wherein the DC-DC power conversion circuitry is configured to perform isolated inductive power transfer across the transformer.

13. The system of claim 1, wherein the DC-DC power conversion circuitry includes gate driver circuitry integrated within the first switch and the second switch.

14. The system of claim 13, wherein the control circuitry is further configured to issue control signals to the gate driver circuitry to operate the first switch or the second switch.

15. A method, comprising:
determining a direction of power transfer through DC-DC power conversion circuitry configured to perform bi-directional power transfer including a first switch and a second switch on either side of a transformer with a first capacitor and a second capacitor configured for isolated capacitive power transfer cross-connected across the transformer;

aligning a primary side and a secondary side of the DC-DC power conversion circuitry based on the determined direction of power transfer;

determining a quantity of power transfer through the DC-DC power conversion circuitry based on power and voltage characteristics of electrical components;

determining a duty cycle and a switching frequency for the first switch or the second switch based on the quantity of power transferred through the DC-DC power conversion circuitry; and controlling switching of the first switch and the second switch by implementing zero current switching turn on and zero voltage switching turn off.

16. A non-transitory computer-readable storage medium including executable instructions, which when executed by circuitry, causes the circuitry to perform the method according to claim 15.

17. A system, comprising control circuitry configured to:
determine a direction of power transfer through DC-DC power conversion circuitry configured to perform bi-directional power transfer including a first switch and a second switch on either side of a transformer with a first capacitor and a second capacitor configured for isolated capacitive power transfer cross-connected across the transformer;

align a primary side and a secondary side of the DC-DC power conversion circuitry based on the determined direction of power transfer;

determine a quantity of power transfer through the DC-DC power conversion circuitry based on power and voltage characteristics of electrical components;

determine a duty cycle and a switching frequency for the first switch or the second switch based on the quantity of power transferred through the DC-DC power conversion circuitry; and control switching of the first switch and the second switch by implementing zero current switching turn on and zero voltage switching turn off.

* * * * *